April 16, 1968
J. E. MARIAN
3,378,425
METHOD AND APPARATUS FOR MANUFACTURE OF LAMINATED OBJECTS
COMPRISED OF WOOD AND SIMILAR VEGETABLE FIBROUS MATERIALS
Filed July 18, 1966
7 Sheets-Sheet 1
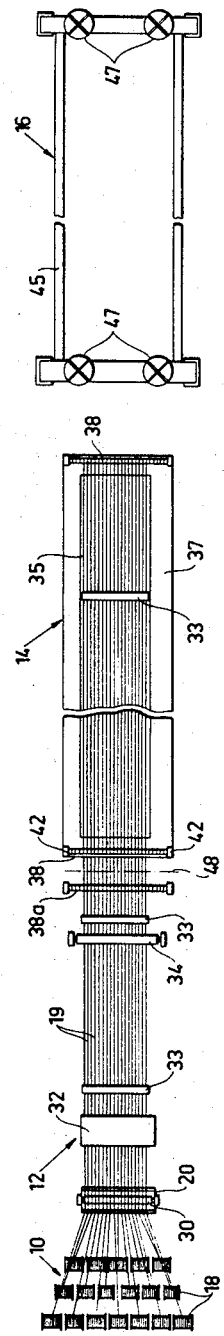
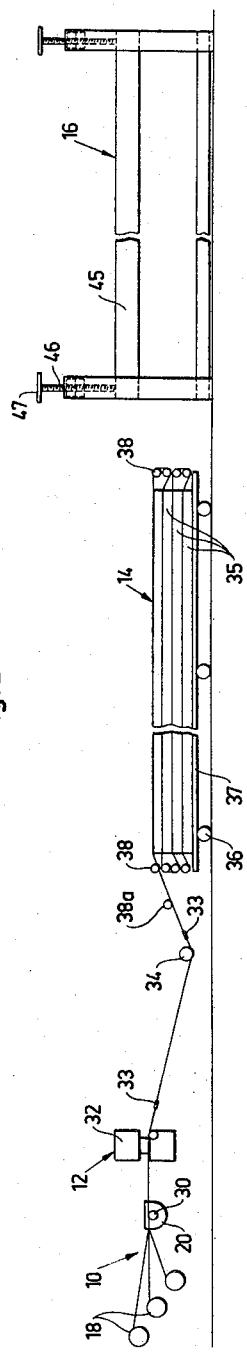
INVENTOR
JOSEF E. MARIAN
By Gregg and Stidham
ATTORNEYS

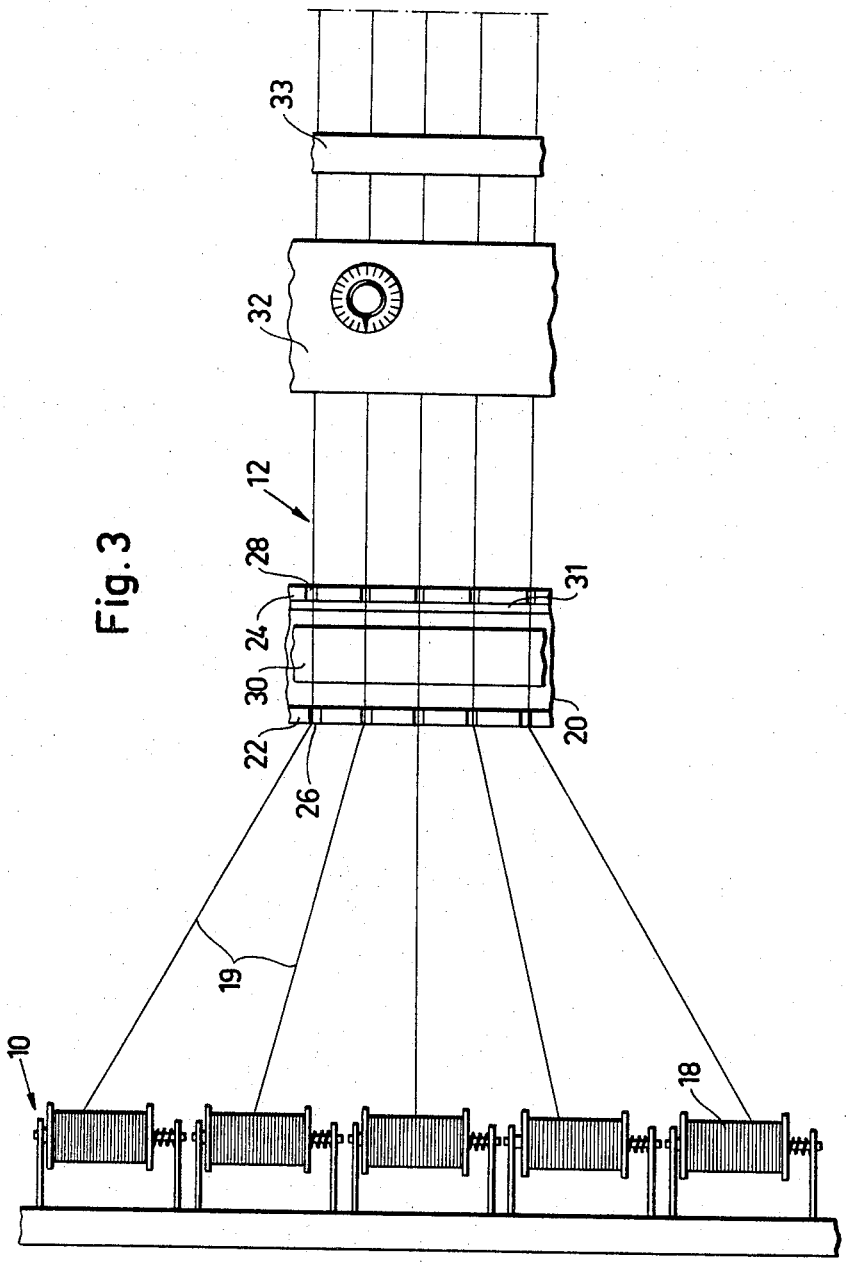

April 16, 1968 J. E. MARIAN 3,378,425
METHOD AND APPARATUS FOR MANUFACTURE OF LAMINATED OBJECTS
COMPRISED OF WOOD AND SIMILAR VEGETABLE FIBROUS MATERIALS
Filed July 18, 1966 7 Sheets-Sheet 3
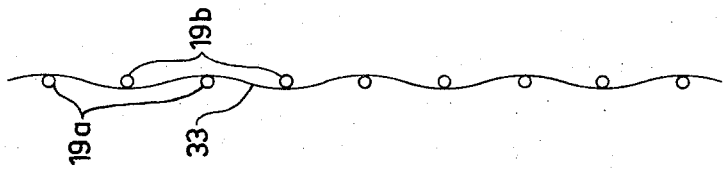
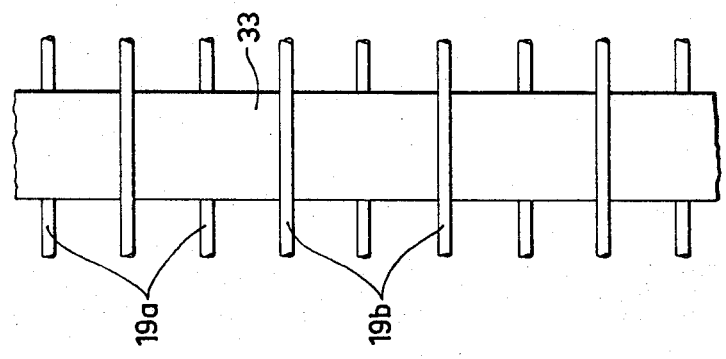
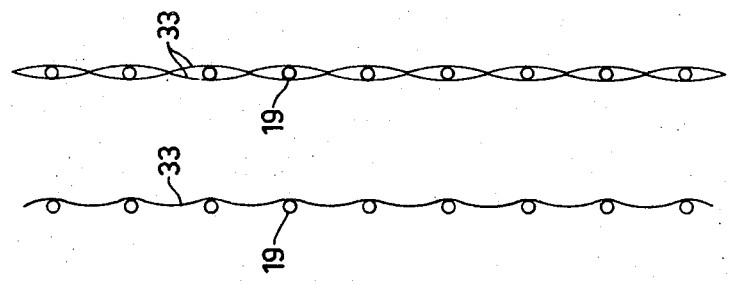
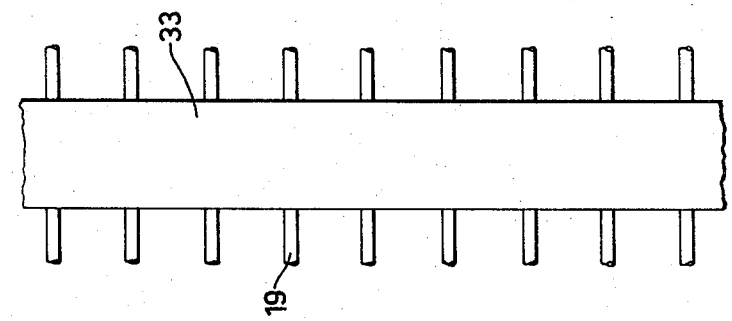
INVENTOR
JOSEF E. MARIAN
BY Greggard Stedham
ATTORNEYS

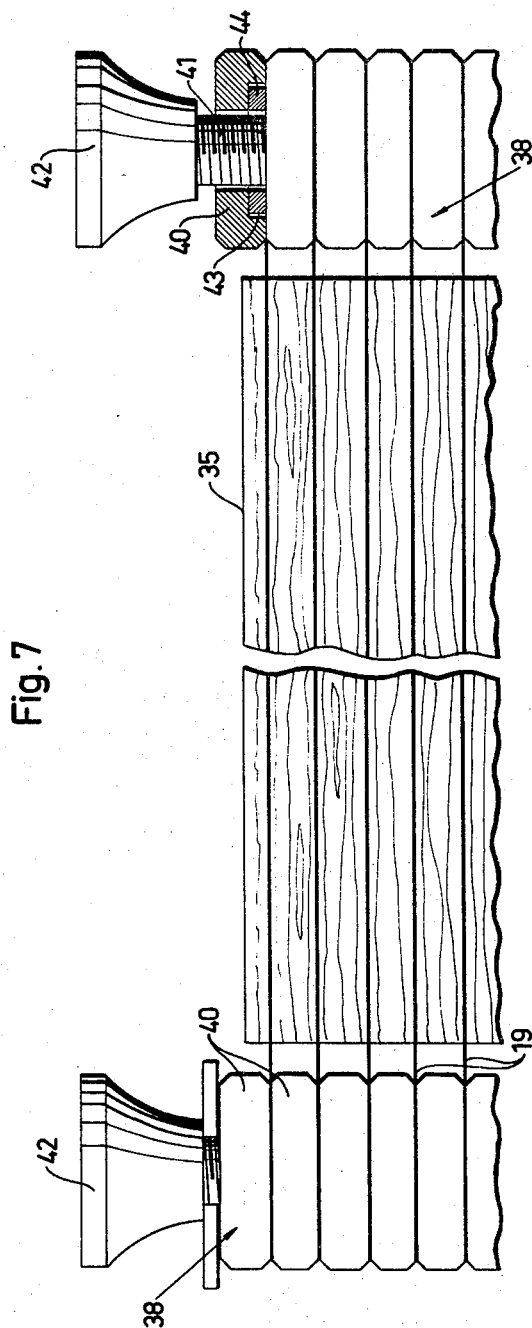

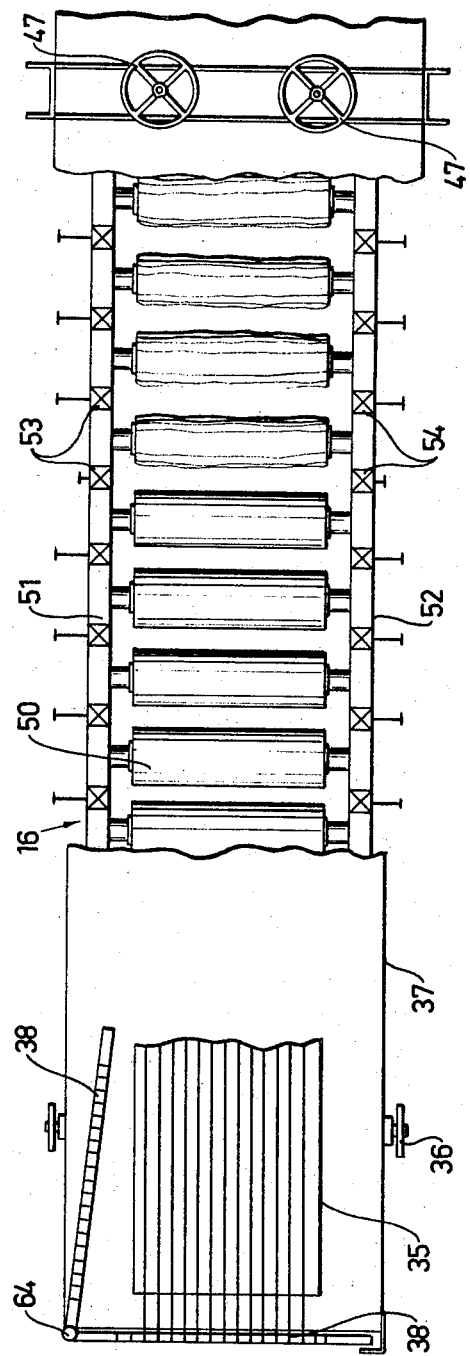

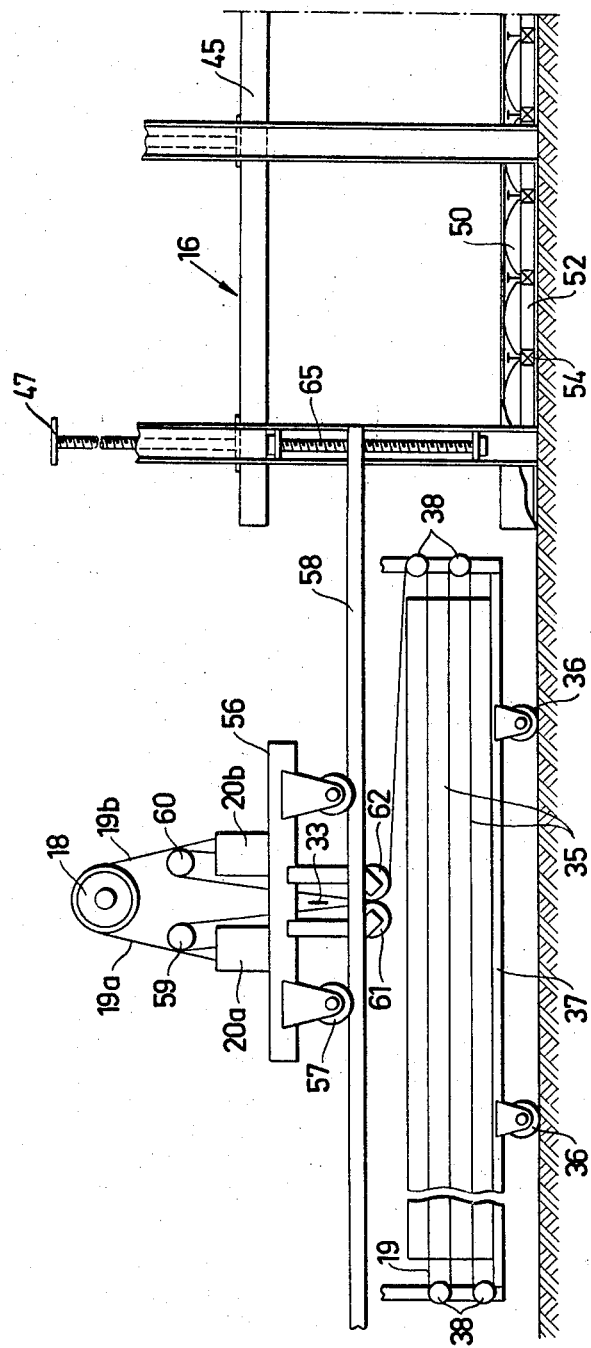

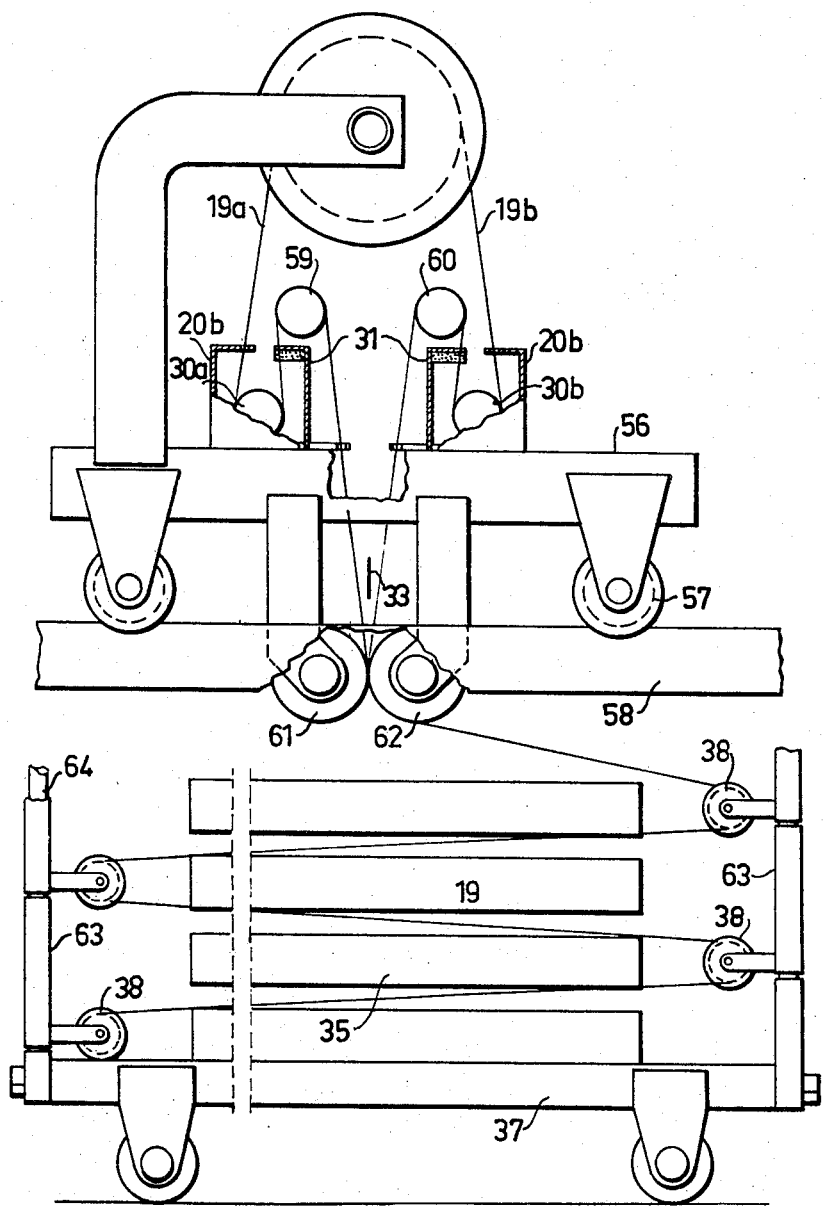

United States Patent Office 3,378,425
Patented Apr. 16, 1968

3,378,425
METHOD AND APPARATUS FOR MANUFACTURE OF LAMINATED OBJECTS COMPRISED OF WOOD AND SIMILAR VEGETABLE FIBROUS MATERIALS
Josef Eric Marian, 2560 Cedar St., Berkeley, Calif. 94708
Filed July 18, 1966, Ser. No. 565,893
5 Claims. (Cl. 156—380)

ABSTRACT OF THE DISCLOSURE

A method and apparatus of manufacturing articles of wood or the like made up of several parts joined together by means of glue joints in which are mounted spaced electrical resistance wires for supplying the necessary heat to bind the adhesive. The wires are drawn from supply rolls and, while being held in fixed positions relative to each other between the surfaces being joined, they are energized to bond the parts together firmly.

---

This invention relates to the manufacture of laminated objects comprised of wood and similar vegetable fibrous materials.

More particularly this invention relates to a method of manufacturing articles made of wood and similar vegetable fibrous materials and composed of several portions joined together by means of glue joints. The articles may take the form of beams, boards or sheets and the wood material from which the separate portions are made may if desired also be pre-treated to fiber pulp, chip or the like. In some cases plastic material mixed with a vegetable material may also be used. The invention also relates to an apparatus for carrying out the method.

It is previously known to supply sufficient heat to bind the glue in the joints, between the separate portions of the article by means of electric resistance wires disposed in the joints proper. When passing a current through said wires the glue-joints are heated and the article need not be heated as a whole to the temperature at which the adhesive binds or is cured.

In hitherto known methods of this type the resistance wires have been given to form of a net, a loop, or have also been disposed in mutually parallel relationship. The wires are connected in parallel or series to a current source. The adhesive has been applied as a solid film or a layer into which the system of wires is pressed so that the film and wire system form an integral part which can be unwound from a reel and placed between the wooden elements to be joined together. Even though the method of joining together the separate portions of the lamella body is in this way simplified, said method is still encumbered with several serious drawbacks. Primarily the adhesive is not distributed to conform with inavoidable deviations from true parallelism of the surfaces of the wood pieces to be joined, and thus the film of adhesive must be made so thick that it is capable, under all conditions, of bridging the spacing between the surfaces of the joint. Consequently the cost of adhesive is unnecessarily high and at the same time the joint is not given the best possible strength.

One main object of the invention is to overcome these drawbacks so that the method becomes more economic and at the same time ensures that the glue joints between the parts of the article obtain the greatest possible strength.

Another object of the invention is to provide a method which affords that the position relative one another of the wires distributed in the form of a mat over the surfaces of the glue joint is influenced by the adhesive only after said adhesive having joined together the parts.

Still another object of the invention is to provide a method which renders possible to dispose the wires of the mat parallel in one direction only substantially coinciding with the direction of the fibers whereby the strength of the finished article is substantially increased.

Further objects and advantages of the invention will become apparent from the following description considered in connection with the accompanying drawings which by way of example illustrate an apparatus for carrying out the method and of which:

FIG. 1 is a plan view of an apparatus designed in accordance with the invention, FIG. 2 being a side elevation of the same test apparatus.

FIG. 3 is a partial view of the apparatus as illustrated in FIG. 1 but in a larger scale.

FIG. 4 is a partial plan view of a wire mat together with distance pieces mounted thereon, and FIGS. 5 and 6 are side elevation of two conceivable embodiments.

FIG. 7 is a partial view of the member of the apparatus in which the wires are mounted between the parts of the article; the figure being in plan view and in larger scale.

FIG. 8 is a plan view of a press in larger scale with portions assumed to have been cut away for the sake of clarity.

FIG. 9 is a diagrammatic view of a modified embodiment for mounting a wire mat between one article formed of several members.

FIG. 10 is a view of a portion of FIG. 9 in a larger scale.

FIGS. 11 and 12 are similar views as presented in FIGS. 4 and 5, of an embodiment of a strip of distance pieces pertaining to the embodiment of FIGS. 9 and 10.

In the drawings, identical or equivalent parts or members have been designated by the same reference numerals.

Referring to the drawings and in particular FIGS. 1 to 8 the apparatus illustrated by the comprises generally of the following major members: a station 10 provided with a bobbin array intended for resistance wires, a station 12 at which strips are joined with a mat or net formed of wires; an assemblage station 14 at which the article is put together and a press 16. Wires 19 are unwound from bobbins 18, which may be arranged in several rows, at the first station 10. The wires have small diameters, for instance in the region of some few tenths of a millimeter, and are suitably of iron, aluminum or copper even though in some cases steel wires of greater strength may be used. To obtain uniform tension in each wire the bobbins are braked individually as they are drawn out together to form a mat with parallel wires.

A receptacle 20 containing liquid adhesive is mounted at station 12. Holes or grooves 26, 28 through which the wires pass are disposed in two opposing walls 22, 24 of the receptacle and spaced apart in accordance with the intended distance between the wires, for instance approximately 6–12 mm. The adhesive is applied to the wires by a roller 30, surplus adhesive being removed by means of wiper blade 31 (FIG. 3). When the wires 19 leave the container 20 they are mutually parallel and form a wire mat which is passed through a hot press 32. At this point the mutual spacing of the wires is ensured by means of strips 33 made of paper, plastic or similar material, which are placed equidistantly across the wire mat. These strips may be self-adhesive or impregnated with synthetic resin. Further, the adhesive applied to the wires 19, in the receptacle 20, contributes towards producing a good connection between the wires and the strips 33 when they are pressed together between the heated surfaces of the press 32. However, it is not always necessary to apply adhesive both to the wires and the strips. Consequently said strips need not themselves be impregnated but may be of the type which adheres to the wires through the medium of the adhesive applied to the latter.

The strips 33 may be applied to the one side of the wires 19, as is shown in FIG. 5, or to strips 33 may also from their sides facing one another be joined to the wires and with each other, respectively, as can be seen from FIG. 6.

The wire mat is now passed around a deflector roll 34 to the assemblage station 14 at which the members or parts making up the articles are assembled. The article in the embodiment illustrated in FIGS. 1–8 is a beam which may be several meters long and which is composed of a number of lamellas or boards 35, these being placed in sequence on top of each other on a carriage 37 equipped with wheels 36. The wire mat is drawn over each board as it is placed in position on the carriage. The wire mat used in the connection has a width which is slightly smaller than that of the boards so that the outer wires are located at a short distance inside the edge of said board, as can be particularly seen from FIG. 7.

Outside the two ends of each board the separate wires in the wire mat are connected to electrodes 38 which may have the form illustrated in FIG. 7. They are composed of discs or washers 40 made of an electrically conductive material having a thickness corresponding to the desired spacing of the wires. The washers are drawn onto a rod 41, on the ends of which are threaded nuts 42 which clamp the washers together to form a column. The washers are provided with a step 43 in which is placed a disc 44 formed of a resilient material, such as rubber or plastic. The thickness of the washers is slightly greater than the depth of the step 43, whereby they are clamped together when tightening the nuts 42. The wires 19 are frictionally held secure by the washers 40 and are connected electrically to the electrodes. The electrodes thus serve as current conductors and distance pieces. The function of the discs 44 is to automatically separate the washers 38 from each other and thereby release the individual wires when the nuts 42 are slackened. The gaps thus formed between the washers substantially facilitate the assembly of all the wires of the wire mat at the same time. Furthermore the strips 33 ensure that the wires maintain their correct position.

At the same time as the wire mat is drawn forwards, over a board 35 said board and the board next in line are supplied with a liquid adhesive on their opposing surfaces. The latter board is passed down against the lower board and the wire mat is now positioned in the layer of liquid adhesive.

In this way the one and the same wire mat can be drawn forwards and backwards over the carriage 37 whilst board after board are placed on top of each other and a liquid adhesive is applied to the glue joints to be formed between said boards. The electrodes 38 may be connected to the end-plates of the carriage 37. The wires 19 are clipped or cut along a line 48 and then joined to an electrode 38a which in the next beam blank forms the lowermost and first electrode.

The carriage 37 is now introduced into the press 16 which is provided at the top with a head member 45 vertically adjustable by means of screws 46 and which can be operated by means of hand wheels 47. The bottom of the press is provided with hydraulically working pressure means suitably constituted of a series of elongated elements 50 having fluid-proof deformable walls, suitably made of the same material as that used in fire hoses. The elements 50 may be tubular in shape and are mounted side by side across the press and connected at the ends in parallel with longitudinally extending conduits 51, 52 which are connected to a pressure source, for instance a water pump, and an outlet respectively and in which are mounted valves 53, 54 so that an arbitrary number of pressure elements 50 can be connected in the system depending on the length of the beam. In FIG. 8 the four pressure elements 50 situated on the far right are imagined to be inoperative. The pressure elements enable an even distribution of the pressure over the entire length of the beam blank.

The separate members, in the embodiment in consideration the boards 35, of the beam blank are pressed together in the press 16 under a relatively high pressure, e.g. in the order of 5–15 kg./cm.$^2$. At the same time the electrodes 38 are connected to the current source. If the electric current is to be conducted in series through the portions of the wire mat situated between the boards only the outmost electrode rods are connected to the current source. The adhesive supplied in liquid form is transformed by heating into solid form and cured. The curing time may differ from between 3 and 30 mins. and is generally kept between 10 and 15 mins. The adhesive may be an inexpensive one of the thermosetting type such as a phenol or carbamide resin.

The wires 19 are mounted parallel to the fibres provided that their main direction is the same as that of the separate members or parts, of which the laminated article is composed. In this way the weakening which might otherwise occur if the wires cross the direction in which the fibres extend and are pressed into the wood by the glue pressure, is avoided. The wires occupy only a small percentage, e.g. 3 to 7%, of the area of the joint. The method of extending the wires parallel to the longitudinal edges of the boards or parts counteracts leakage of the liquid adhesive laterally before the same has been heated electrically and transformed into solid state. The outermost wires, which are thus positioned nearest the side edges of the parts, may have less resistance than the inner wires to compensate for the high cooling effect at the edges. Subsequent to assembling a number of boards together they may be given a curved contour before the glue had hardened, the resistance wires without difficulty sliding in the glue joints. In this way a beam can be given any desired curved contour.

The strips 33 are of such material, e.g. paper, that they are easily impregnated by the liquid adhesive so that the binding effect between the members is not impaired at the positions occupied by such strips.

The embodiment illustrated in FIGS. 9 to 12 differs from the previous embodiment in that a carriage 56 is movably positioned with its wheels 57 on a framework 58 above the carriage 37 in its position withdrawn from the press 16. The carriage 56 suitably supports several rows of bobbins 18 from which two groups 19a, 19b of wires are unrolled. Each of the two groups are passed out into a receptacle 20a, 20b containing liquid adhesive, turning around rollers 30a, 30b located in said receptacles. In other respects the receptacles 20a, 20b are designed in the same way as the receptacles 20 previously described. Each of the wires are thus passed around its deflector roller 59, 60 obliquely down towards two heated cylindrical rollers 61, 62 which are pressed together. Situated between the two groups 19a, 19b of wires are strips 33 which between the rollers 61, 62 are securely connected to the wires. In this way the embodiment according to FIG. 11 is obtained, i.e. the strip 33 will have the wires 19a, 19b alternately placed on its two sides. Consequently the strips 33 can be dispensed with in some cases, the station 12 being omitted.

The finished wire mat is connected with electrodes 38 as described above whilst the carriage 56 is moved by means of a driving motor (not shown) backwards and forwards over the carriage 37. These electrodes are secured in arms 63 which are mounted at one end about a vertical shaft 64 so that the arms can be swung out of the way (cf. also FIG. 8). In this way elements such as boards 35, are placed on top of each other after that a portion of the wire mat has been drawn over each element and the abutting surfaces of two adjacent elments been provided with a coating of liquid adhesive. As the stack of boards increases in height the head member 58 is lifted upwards by means of screws 65 or similar members. The carriage 37 together with the prepared stack of boards is passed into the press 16, the pressing element of which is set into motion and electrodes 38 of the wires are connected to the current supply to supply the necessary current to cure the adhesive.

While several embodiments of the invention have been shown and described, it is to be understod that the invention is not to be limited thereby but its scope is to be determined by the appended claims.

What I claim is:

1. An apparatus for manufacturing bonding articles of wood or the like together by means of a glue joint in which are mounting mutually spaced electrical resistance wires for supplying the necessary heat to bind the adhesive characterized by a first station where a plurality of wire supply rolls is mounted, means for feeding the wires from said rolls to a second station, guide means for maintaining said wires in mutually parallel relationship as they are being fed to said second station, means at said second station for holding said wires in parallel relationship to form a mat, a third station having means to introduce a portion of said mat between two of said articles having their opposed surfaces coated with adhesive, and electrodes disposed on opposite sides of said articles for electrical connection to said wires at opposite ends of said mat.

2. The apparatus of claim 1 wherein said wire holding means also comprise said electrodes for connection to a current source.

3. The apparatus of claim 1 wherein said third station includes a reciprocable carriage, and mat feeding means on said carriage adapted to carry that mat back and forth while articles being bonded are interposed between successive runs thereof.

4. The apparatus of claim 3, wherein the wire supply rolls are mounted on said carriage.

5. The apparatus of claim 1, including adhesive strips secured across the wire mat to maintain the position of the wires relative to one another.

References Cited

UNITED STATES PATENTS

| 1,960,120 | 5/1934 | Mohring | 156—275 |
| 2,261,264 | 11/1941 | Luty | 156—275 |
| 2,662,045 | 12/1953 | Baggott | 156—275 |

FOREIGN PATENTS 518,289 2/1940 Great Britain.

DOUGLAS J. DRUMMOND, *Primary Examiner.*